Jan. 17, 1961  R. E. TISCH  2,968,501
FLUID SEAL
Filed April 18, 1957
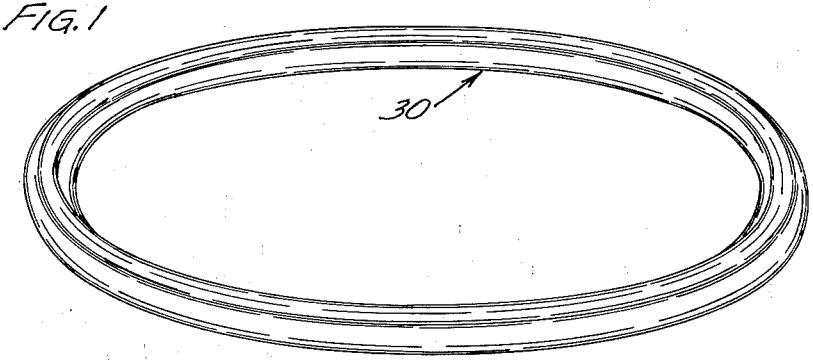
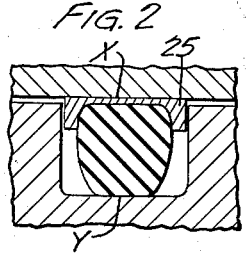
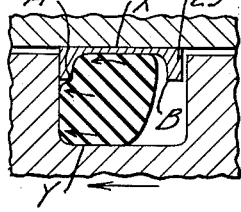
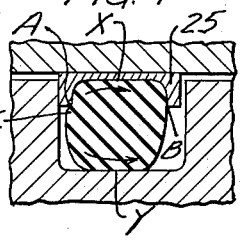
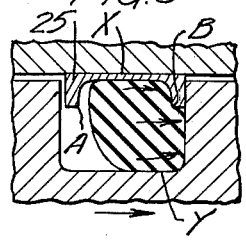
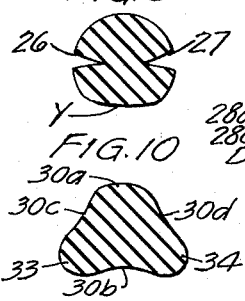
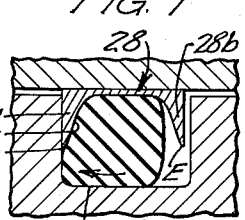
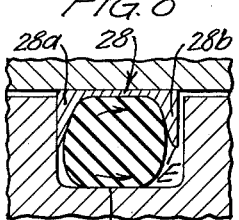
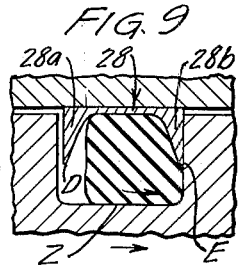
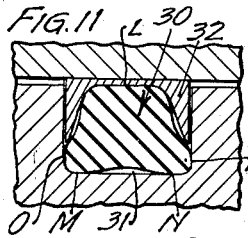
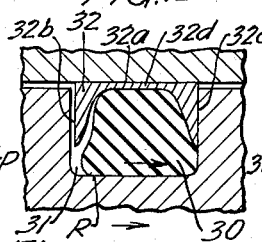
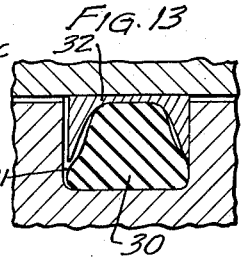
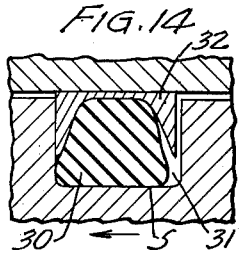
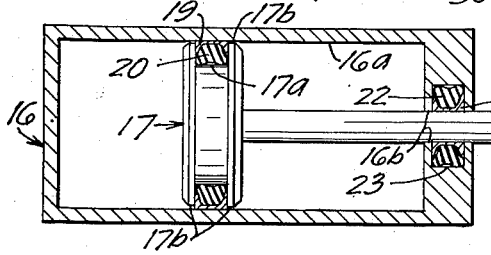
INVENTOR.
RICHARD E. TISCH
BY
Williamson, Schroeder, Adams & Meyers
ATTORNEYS

United States Patent Office 2,968,501
Patented Jan. 17, 1961

2,968,501

FLUID SEAL

Richard E. Tisch, Minneapolis, Minn., assignor to A-P-D Co., Minneapolis, Minn., a corporation of Minnesota Filed Apr. 18, 1957, Ser. No. 653,643

5 Claims. (Cl. 286—26)

This invention relates to sealing devices. More particularly, it relates to fluid seals between relatively reciprocable members such as pistons and cylinders and piston rods and cylinder heads, as examples, and for relatively rotating members such as shafts in housings. It is particularly adapted for hydraulic and pneumatic systems.

It has been discovered that the life of a sealing unit may be prolonged by utilizing a sealing ring or boot made of polytetrafluoroethylene resin, a plastic material commonly known under the trade name of Teflon. It has been found that when a sealing ring or boot made of this material is utilized in combination with a conventional sealing ring which serves as a backing member, the resultant sealing unit will have a prolonged useful life as compared to the useful span of life of the sealing ring if it were used alone. The material known as Teflon has the unusual characteristic of transferring to a metal against which it rubs in the form of a thin film and becomes self-lubricating with very low friction and long life. Teflon retains its good bearing characteristics over a wide range of temperatures. For these reasons Teflon has been used in O rings with success under suitable conditions. However Teflon O rings have definite limitations as compared to rubber O rings, although having certain advantages thereover. One advantage of the use of such a sealing ring or boot in combination with an O ring is that after the boot has worn through, the O ring still provides a sealing surface which will function satisfactorily for an indefinite period thereafter, providing of course that the structure of the O ring itself has not failed in the meantime under the adverse effects of repeated changes of direction of pressure. The advantages and disadvantages of these structures can best be appreciated by reference to United States Letters Patent No. 2,784,013, issued March 5, 1957, to William Groen and entitled "Hydraulic Seals." In this patent, the inventor, William Groen, points out that there are certain distinct advantages to be obtained through the use of a conventional O ring in combination with a particular type of sealing ring or boot. The cross-sectional configuration of an O ring is conventionally circular and as a result thereof, certain disadvantages are attendant therewith as will be hereinafter set forth.

I have found however, that although an O ring, when used in combination with a sealing ring or boot as described in said United States Letters Patent No. 2,784,013, provides a fluid seal of longer useful life span, it nevertheless tends to break down earlier than desirable under repeated changes in direction of pressure. In other words, I have found that the cross-sectional configuration of an O ring is not ideal for use in combination with such a boot or sealing ring and that a ring or backing member of another cross-sectional configuration does have definite advantages over the conventional O ring which is made of rubber and is circular in cross-sectional configuration. The O ring when used in combination with such a boot tends to wear off rapidly at the point where it seals with the bottom of the sealing groove and tends to fail completely as a result of repeated changes of direction in pressure and consequent flow of materials around the peripheral portions of the boot. My invention is directed toward overcoming these disadvantages.

It is a general object of my invention to provide a novel and improved seal of simple and inexpensive construction and installation.

A more specific object is to provide a novel and improved seal which will provide an effective seal under a wide variation in pressure and for a prolonged period in excess of that provided by fluid seals as heretofore known.

Another object is to provide a novel and improved sealing member for use in combination with a boot made of Teflon or similar material which will have a substantially longer useful life span.

Another object is to provide a novel and improved backing member having an optimum design in its cross-sectional configuration in order to provide the maximum useful life span for the hydraulic seal.

Another object is to provide a novel and improved backing member having an optimum design in its cross-sectional configuration in order to reduce to a minimum the extent of rubber flow and scrubbing between the backing member and the bottom of the sealing groove.

These and other objects and advantages of my invention will more fully appear from the following description made in connection with the accompanying drawings, wherein like reference characters refer to the same or similar views, and in which:

Fig. 1 is a perspective view of one embodiment of my invention.

Fig. 2 is a sectional view of a sealing groove, showing a sealing ring or boot used in combination with an O ring in the groove at rest or under low pressure.

Fig. 3 is a sectional view of a sealing groove, showing a sealing ring or boot used in combination with the O ring shown in Fig. 2 with pressure applied in the direction of the arrows.

Fig. 4 is a sectional view of the groove shown in Figs. 2 and 3 with the pressure reversing in direction and disclosing the changes in cross-sectional configuration which takes place under such circumstances.

Fig. 5 is a sectional view of the sealing groove shown in Figs. 2–4 after the change in pressure direction has been completed and the cross-sectional configuration of the O ring has changed to a maximum as a result thereof.

Fig. 6 is a cross-sectional view of an O ring illustrating the wear and the ultimate failure of the ring as a result of the changes in direction of pressure and the shifting of the ring and the flow of the material thereof resulting from these changes in pressure direction.

Fig. 7 is a sectional view of a sealing groove with a sealing ring or boot of an improved cross-sectional configuration mounted therein in combination with an O ring with the pressure being applied in the direction indicated by the arrow.

Fig. 8 is a sectional view of the sealing groove shown in Fig. 7 illustrating the change which takes place within the material from which the O ring is made as the direction of pressure begins to be reversed.

Fig. 9 is a sectional view of the structure shown in Figs. 7 and 8 illustrating the configuration of the O ring after the change in direction of pressure has been completed.

Fig. 10 is a cross-sectional view of my sealing ring as illustrated in Fig. 1.

Fig. 11 is a sectional view of a sealing groove showing a sealing ring or boot similar to that shown in Figs. 7–9 with one of my sealing rings or backing members of improved cross-sectional design mounted within the groove in combination with the boot.

Fig. 12 is a cross-sectional view of my sealing ring or backing member as shown in Fig. 11 after the pressure has been applied in the direction of the arrow indicated.

Fig. 13 is a cross-sectional view of the groove, backing member and boot shown in Figs. 11 and 12, and illustrating the configuration of my backing member as the direction of pressure is changing.

Fig. 14 is a cross-sectional view of the sealing groove, boot and backing member shown in Figs. 11–13, when the change of pressure direction has been completed as indicated by the arrow.

Fig. 15 shows a simple cylinder containing a piston connected to a piston rod which extends through an aperture in one end of the cylinder, and illustrates how my backing member may be utilized in combination with such a boot when the sealing groove is formed in either the inner or outer surface of a cylindrically shaped bearing surface.

Referring to Fig. 15, there is shown a simple cylinder 16 containing a piston 17 connected to a piston rod 18 which extends through an aperture in one end of the cylinder 16.

A seal is effected between the piston 17 and the wall 16a by a Teflon band or ring 19 and a rubber ring 20 positioned in an annular groove 17a in the peripheral wall 17b of the piston 17. A seal is effected between the piston rod 18 and the end or head of the cylinder 16 by a Teflon ring 21 and a rubber sealing ring 22 positioned in a groove 23 in the bearing surface 16b which engages the piston rod 18. The only essential difference between the seal for the piston and the seal for the piston rod, is that in the former the groove is in an external surface and the Teflon ring is in the radially outer portion of the groove whereas in the piston rod seal the groove is in an internal cylindrical surface and the Teflon ring is positioned in the radially inner portion of the groove. Obviously this is simply a reversal of parts. In each case the Teflon ring is at the opening of the groove and the rubber ring is positioned therebehind.

The problem involved can best be appreciated by reference to Figs. 2–9. In Fig. 2 there is shown an O ring at rest or at low pressure under a slight radial squeeze which perfects a seal between the Teflon boot 25 at a point designated generally as X and also at a point designated generally as Y at the bottom of the groove. If material is worn away at X or Y, the radial compression to which the O ring is subjected in the assembly of the sealing unit or the squeeze is reduced and the sealing ability of the unit is impaired and thus its effective sealing life is shortened.

Fig. 3 shows the same structure as that illustrated in Fig. 2 when pressure is applied in the direction of the arrows. When this takes place the rubber flows to the left as viewed in Fig. 3 and the rubber from which the O ring is made is strained around the corner indicated generally as A, thus causing local high stress within the material from which the O ring is made. When pressure is applied the rubber flows in proportion to the pressure; at high pressure it is strained around the relatively sharp corner A of the boot and causes high local stresses in the rubber fibers at that point.

In Fig. 4 the same structure is shown with the pressure in the process of being reversed. It will be noted that the surface of the O ring against the bottom of the groove, scrubs along the comparatively rough groove bottom or must pass the corner A at C, thereby starting a rupture in the material from which the O ring is made. When the pressure shown in Fig. 3 is released and reversed as shown in Fig. 4, the strained rubbers basic elastic memory tries to return it to its original installed shape. In order to do so, it must either scrub along the relatively rough groove bottom or rotate back past the sharp corner A of the boot. Which of these two it does is dependent upon the relative friction of the two surface contact areas; under normal conditions it will do both to a certain extent, with the probability that friction against the inside of the Teflon boot will be less than that against the bottom of the groove. However, the tendency of the material of the O ring to hang upon the corner A of the boot, may force scubbing against the groove bottom. In any event it is certain that the rubber fibers are placed under tension as they try to pass by the corner A.

Fig. 5 illustrates the same structure when the pressure has been applied in full force in the reversed direction. When this takes place the area of the O ring on the opposite side from that which engages the corner A of the boot flows around the opposite corner B of the boot and causes high local stress to be induced within the rubber. Thus an oppositely disposed portion of the O ring is strained around the opposite corner of the boot when the pressure is reversed and this strain as thus illustrated in Figs. 3 and 5 takes place repeatedly with each change in direction of the pressure. In time there is either a rupture of the fibers at the areas which have been strained around the shoulders A and B of the boot, and have been pulled in tension as the O ring tries to rotate around to the opposite ends of the space within the sealing groove; or there is substantial scrubbing away of the sealing surface Y with consequent reduction of necessary squeeze at the points X and Y. Actually both of these undesirable actions take place in some degree. In either case the sealing life of the O ring is reduced.

Fig. 6 illustrates an O ring after it has been subjected to repeated changes in direction of pressure as discussed with respect to Figs. 2–5. It will be noted that the O ring has failed completely as a result of separation of the rubber material at the points indicated by the numerals 26 and 27. In addition, the bottom side or the surface of the O ring which bears against the bottom of the groove, has been worn flat or rather the material at this point has been chewed away as the result of repeated scrubbing against the bottom of the groove. The wearing away at the point Y when it becomes as substantial as shown in Fig. 6, reduces the radial compression to which the O ring has been subjected to such an extent that it can no longer maintain an effective seal at the points X and Y.

Figs. 7–9 show a Teflon boot having a slightly different cross-sectional configuration which it has been found aids in reducing the wear upon an O ring. It will be noted that the boot 28 has a relatively thin intermediate portion similar to that of the boot described in United States Letters Patent No. 2,784,013, but that the marginal portions 28a and 28b are tapered to provide a type of surface resembling a ramp along which the rubber material from which the O ring is made may flow. The marginal portions 28a and 28b do not have the sharp corners A and B of the boot 25 and thus some of the wear resulting from the flow of the rubber around the sharp corners is eliminated. Nevertheless, I have found that even when the boot is made in the configuration of the boot 28 there is still an appreciable amount of scrubbing at the surface of the O ring which bears against the bottom of the groove with the result that the sealing unit will fail after repeated changes in direction of pressure at a date earlier than it is desirable. In Fig. 7 pressure is applied in the direction of the arrows as indicated. In Fig. 8 the pressure is reversing in direction and the portion of the O ring which bears against the bottom of the sealing groove scrubs along that surface or slides up along the ramp 28c of the boot. Fig. 9 shows the configuration of the O ring after the chang in direction of pressure has been completed. Although there is no apprecibale overstrain of the rubber in Figs. 7 and 9 at points D and E, there still is substantial scrubbing at the sealing point Z. After awhile the O ring will be worn down sufficiently as the result of this scrubbing so that there will no longer be sufficient radial squeeze to provide the necessary sealing contacts. With the tapered ramp-like shoulders on the boot 28, there is little or no overstrain of the rubber around any sharp corners. Also the tendency for the rubber material from which the O ring is made, to hang on such corners, is substantially reduced. The backing or O ring, therefore, rotates back and forth inside the boot as the pressure is reversed. In order to fill the corners of the groove at F and G, however, there is still some scrubbing of the rubber along the bottom of the groove with consequent reduction in squeeze and eventual seal leakage around the back of the O ring.

Referring to Fig. 10, there is shown therein in cross-section, a sealing ring having the particular cross-sectional configuration designed by me in order to eliminate these undesirable actions. The ring-like member indicated generally as 30 in Fig. 1 is shown installed in a groove 31 in Fig. 11, in combination with a Teflon boot 32. The pressure in Fig. 11 is at rest or at relatively low pressure and the ring-like member 30 is placed under radial squeeze which causes a seal to be perfected at the points indicated generally as L, M, and N. When at low pressure there may also be a seal perfected at the points O and P. When pressure is applied in the direction of the arrow shown in Fig. 12 there is very little rubber flow and the scrubbing, if any, which takes place, is very light and takes place on the lobe of the ring-like member 30 at the point R. Fig. 13 shows the shape of the ring-like member 30, which is formed of a resilient flowable material throughout, while the pressure is reversing. It will be noted that there is very little rubber flow and the scrubbing, if any, which takes place, is very light at the lobe R. Fig. 14 shows the configuration of the ring-like member 30 when the reversal of the direction of pressure has been completed and illustrates the fact that there is very little rubber flow and a minimum of scrubbing, the latter of which takes place, if any, at the point S upon the opposite lobe of the ring-like member 30.

For the sake of description, it will be noted that the boot 32 in combination with which the ring-like member 30 is used, has a width such that it may sit within the groove 31 and slide slightly axially thereof. It has a cylindrical working face 32a complementary to and of substantially the same diameter as the working surface against which it bears. It will be noted that the sealing ring or boot 32 has a zone of substantial width between its edge portions 32b and 32c. This zone of substantial width 32d, is of substantially lesser thickness than its edge portions 32b and 32c.

For the sake of description, the ring-like member 30, when its cross-sectional configuration is considered, is generally trapezoidal in shape with one of the substantially parallel surfaces 30a being slightly convexly shaped in an axial direction and the other substantially parallel surface 30b being slightly concavely shaped in an axial direction. The two non-parallel sides 30c and 30d are slightly concave in shape in a radial direction. The concave parallel side 30b is longer axially than the convexly shaped parallel side 30a, and when used in combination with a boot 32, the axially shorter surface 30a always bears against the relatively thin central portion 32d of the boot, while the concave surface 30b which is axially longer, always bears against the bottom of the groove. It is deemed obvious that the ring-like member 30 may be made so that the convex surface 30a is either the inner or the outer surface as desired. For example, in Fig. 15 the parallel convex surface is the outer peripheral surface of the ring-like member 20 while the concave parallel surface is the inner peripheral surface of the ring-like member 20. On the other hand, the slightly convex parallel surface may be the inner peripheral surface as is illustrated by the ring-like member 22. Fig. 15 shows this ring-like member 22 having the concave parallel surface constituting the outer peripheral surface of that ring-like member. In each case it will be noted, however, that the concave axially longer surface bears against the bottom of the groove while the slightly convex axially shorter surface bears against the relatively thin portion 32d of the boot or sealing ring 32.

From the above, it can be seen that because of the particular cross-sectional design of the ring-like member 30, less radial squeeze is required to produce the same sealing effectiveness as that of an O ring under higher squeeze. As a result the tendency to wear the sealing surfaces during the scrubbing action is substantially reduced. In addition, when pressure is applied the rubber of the trapezoidal cross-sectional shaped ring 30 need not move to any appreciable amount to fill the corner of the groove opposite the direction of pressure application. With very little rubber flow, the lobe nearest the application of pressure moves over only a very short distance and thus the scrubbing of that lobe is very light. Fig. 10 shows the lobes 33 and 34 which are disposed at either end of the concavely shaped surface 30b which is the axially longer parallel side of the ring-like member. These lobes 33 and 34 always bear against the bottom of the groove. When pressure is reduced and is being reversed, the lobe moves back a very short distance with very little scrubbing. When reverse pressure is applied, again there is very little rubber flow and the lobe on the side of the ring-like member away from the application of pressure moves only a very short distance and the consequent scrubbing of that lobe is very light.

It will be noted that the concavities which are provided by the concave surfaces of the sides 30b, 30c and 30d, are provided to allow space for the swelling of the rubber which is normally encountered when hydraulic fluid comes in contact therewith. These concavities also act as lubricant carrying pockets to reduce the sliding friction.

I have found that when a ring-like member 30 is made with the particular cross-sectional configuration disclosed and claimed herein, the useful life span of the backing member is substantially increased. In fact when the backing member is made of rubber and is designed as shown and claimed herein, it is not uncommon for the boot to wear out completely and even thereafter to have the ring-like member provide an efficient and effective seal for a very long period thereafter.

The ring-like member 30 can be manufactured substantially as cheaply as the O rings disclosed in combination with the boot in United States Letters Patent No. 2,784,013. Thus it can be seen that I have provided an improved seal which has a substantially longer life span and which will provide an equally or more effective seal than was heretofore known at substantially the same or lesser cost.

It should also be noted that the ring-like member 30 has other distinct advantages such as the fact that its particular cross-sectional configuration tends to preclude the backing member from rolling within the groove and therefore reduces the extent of scuffing or wear normally attendant to the changes in direction of pressure. Also, since the ring-like member 30 has lobes at either end of the concave surface which bears against the bottom of the groove, this ring-like member touches at these lobes at two points so that a better seal is provided than through the use of an O ring wherein only one point of seal is provided. As a result of the fact that there is a seal at two points at all times at the bottom of the grooves and may be a seal at four points adjacent the bottom of the groove when low pressures are utilized, less radial squeeze or compression is required in order to maintain an effective seal. Because of this fact there is a lesser tendency to wear in connection with the shifting of the rubber when the direction of pressure is changed.

It will, of course, be understood that various changes may be made in the form, details, arrangement and

What is claimed is:

1. A sealing device comprising a continuously formed ring-like member made of a resilient flowable material throughout and adapted to be fitted into a sealing groove of ring-like configuration to cooperatively form a seal in conjunction with a sealing ring of generally U-shaped cross-sectional configuration, said member having an inner peripheral surface and an outer peripheral surface, one of said surfaces being axially shorter than the other and adapted to bear against the portion of such a sealing ring between the legs of its U-shaped form when such a sealing ring and said member are installed within such a sealing groove, and the other of said peripheral surfaces in its free form being concavely shaped and adapted to bear against the bottom of the groove when said member and the sealing ring are so installed to permit the flowable material from which said member is formed to completely fill the space between said surface and the bottom of the groove to form a substantially flat surface along the bottom of the groove when fluid pressure is alternately applied to the sealing device from opposite axial directions whereby scuffing of the portions of said ring-like member engaging the bottom of the groove is substantially reduced.

2. The structure defined in claim 1, wherein said ring-like member when in its free state has two end surfaces concaved radially and has a pair of axially spaced lobes one each of which is disposed at each end of said concavely shaped peripheral surface, said lobes having a convexly shaped exterior surface.

3. In combination, a pair of relatively movable members having slidably fitted complementary cylindrical working surfaces, an annular groove formed at one of said surfaces, and juxtaposed to the other of said surfaces, and a fluid seal for sealing between said two movable members comprising a circumferentially continuous sealing ring having an axial dimension less than the axial dimension of said groove such that the sealing ring is adapted to move axially within the groove upon relative movement of the movable members with respect to one another, said sealing ring having a cylindrical working face complementary to and of substantially the same diameter as the other of said working surfaces, a continuously formed ring-like member made of a resilient flowable material throughout positioned back of said sealing ring, the combined radial thickness of the sealing ring and said ring-like member when the latter is in its free state being greater than the radial depth of the groove, and the sealing ring being of substantially stiffer material than said ring-like member, whereby said member is radially compressed between the bottom of the groove and the sealing ring when the seal is installed in the groove, said sealing ring having an intermediate zone of substantial width between its edge portions which is of substantially lesser thickness than its edge portions, said ring-like member having an inner and an outer peripheral surface, one of said surfaces being axially shorter than the other and bearing against said intermediate portion of said sealing ring when said seal is installed in the groove, the other of said surfaces in its free form being concavely shaped and bearing against the bottom of the groove when said seal is installed in the groove to permit the flowable material from which said member is formed to completely fill the space between said other surface and the bottom of the groove to form a substantially flat surface along the bottom of the groove when fluid pressure is alternately applied to the seal from opposite axial directions and upon relative movement of said sealing ring with respect to the relatively movable member having the groove formed therein whereby scuffing of the portions of said ring-like member engaging the bottom of the groove is substantially reduced.

4. The structure defined in claim 3, wherein said ring-like member has two end surfaces concaved radially.

5. The structure defined in claim 3, wherein said ring-like member when in its free state has a convexly shaped lobe at each end of its concave surface which bears against the bottom of the groove.

References Cited in the file of this patent

UNITED STATES PATENTS

| | | |
|---|---|---|
| 2,360,731 | Smith | Oct. 17, 1944 |
| 2,521,248 | Parker | Sept. 5, 1950 |
| 2,728,620 | Krueger | Dec. 27, 1955 |
| 2,760,794 | Hartranft | Aug. 28, 1956 |
| 2,783,068 | Bloom et al. | Feb. 26, 1957 |
| 2,784,013 | Groen | Mar. 5, 1957 |
| 2,873,132 | Tanner | Feb. 10, 1959 |